(12) United States Patent
Agrawal

(10) Patent No.: US 10,241,898 B2
(45) Date of Patent: Mar. 26, 2019

(54) METHOD AND SYSTEM FOR ENABLING SELF-MAINTAINABLE TEST AUTOMATION

(71) Applicant: Wipro Limited, Bangalore (IN)

(72) Inventor: Rajiv Kumar Agrawal, Bangalore (IN)

(73) Assignee: Wipro Limited, Bangalore (IN)

( * ) Notice: Subject to any disclaimer, the term of this patent is extended or adjusted under 35 U.S.C. 154(b) by 192 days.

(21) Appl. No.: 15/078,575

(22) Filed: Mar. 23, 2016

(65) Prior Publication Data
US 2017/0262359 A1    Sep. 14, 2017

(30) Foreign Application Priority Data

Mar. 11, 2016   (IN) .............................. 201641008657

(51) Int. Cl.
G06F 11/36    (2006.01)
(52) U.S. Cl.
CPC ................................ *G06F 11/3684* (2013.01)
(58) Field of Classification Search
CPC ............. G06F 11/3668; G06F 11/3672; G06F 11/368; G06F 11/3684; G06F 11/36; G06F 11/362; G06F 11/3664; G06F 11/3692; G06F 11/3696
USPC ................................................. 717/124–135
See application file for complete search history.

(56) References Cited

U.S. PATENT DOCUMENTS

| | | | |
|---|---|---|---|
| 6,948,152 B2 * | 9/2005 | Dubovsky ........... | G06F 11/3664 345/594 |
| 8,271,950 B2 * | 9/2012 | Bharadwaj .......... | G06F 11/3684 717/124 |
| 8,452,813 B2 * | 5/2013 | Farchi ................ | G06F 11/3676 707/792 |
| 8,924,933 B2 | 12/2014 | Doshi et al. | |
| 9,104,811 B1 * | 8/2015 | Cohen ...................... | G06F 8/30 |
| 9,170,809 B1 * | 10/2015 | Cohen ................ | G06F 11/3672 |
| 9,218,269 B2 * | 12/2015 | Dolinina ............. | G06F 11/3672 |
| 9,239,777 B1 * | 1/2016 | Cohen ................ | G06F 11/3684 |
| 9,311,224 B1 * | 4/2016 | Cohen ................ | G06F 11/3688 |

(Continued)

OTHER PUBLICATIONS

M. Blackburn, R. Busser, A. Nauman and T. Morgan, "Life cycle integration use of model-based testing tools," 24th Digital Avionics Systems Conference, Washington, DC, 2005, 13 pp. (Year: 2005).*

(Continued)

*Primary Examiner* — Andrew M. Lyons
(74) *Attorney, Agent, or Firm* — Finnegan, Henderson, Farabow, Garrett & Dunner LLP

(57) ABSTRACT

The present disclosure relates to a method and a system for enabling self-maintainable test automation. In one embodiment, the system creates a test automation suite using historical test scenarios and automatically updates the test automation suite based on functional changes in one or more related applications. The system determines one or more reusable automation units and one or more test data units that are affected by the functional changes identified in test scenarios received as input and accordingly updates the one or more reusable automation units and one or more test data units. Thus, the system enables self-maintainable test automation, thereby eliminating the effort and expertise required to create automation test suite, build automation scripts, and modify automation scripts for future enhancements.

20 Claims, 5 Drawing Sheets

(56) References Cited

U.S. PATENT DOCUMENTS

| | | | |
|---|---|---|---|
| 9,417,994 B2* | 8/2016 | Ellis | G06F 11/3684 |
| 9,524,231 B2* | 12/2016 | Ellis | G06F 11/3684 |
| 2004/0044993 A1* | 3/2004 | Muller | G06F 11/3664 717/124 |
| 2005/0193269 A1* | 9/2005 | Haswell | G06F 11/3684 714/38.13 |
| 2006/0248405 A1* | 11/2006 | Ponczak | G06F 11/3664 714/38.1 |
| 2008/0126293 A1* | 5/2008 | Apuzzo | G06F 11/3684 |
| 2011/0246540 A1* | 10/2011 | Salman | G06F 11/3672 707/812 |
| 2013/0091382 A1* | 4/2013 | Segall | G06F 11/3676 714/32 |
| 2013/0097586 A1* | 4/2013 | Chandra | G06F 11/3684 717/124 |
| 2013/0152047 A1* | 6/2013 | Moorthi | G06F 11/368 717/124 |
| 2013/0185056 A1* | 7/2013 | Ingram | G06F 11/3684 704/9 |
| 2013/0254746 A1* | 9/2013 | Balakrishnan | G06F 11/3608 717/124 |
| 2013/0268260 A1* | 10/2013 | Lundberg | G06F 17/28 704/8 |
| 2015/0007138 A1* | 1/2015 | Sabetta | G06F 11/3684 717/124 |
| 2015/0356001 A1* | 12/2015 | Murugesan | G06F 11/3688 717/124 |
| 2016/0140033 A1* | 5/2016 | Alexeevich | G06F 11/3688 717/125 |
| 2016/0210224 A1* | 7/2016 | Cohen | G06F 9/44589 |
| 2017/0067882 A1* | 3/2017 | Bornhop | G01N 33/5302 |

OTHER PUBLICATIONS

J. Joy and D. P. Singh, "A generic framework design to enhance capabilities of an enterprise test automation framework," 2015 International Conference on Applied and Theoretical Computing and Communication Technology (iCATccT), Davangere, 2015, pp. 207-212. (Year: 2015).*

M. Kalinowski, H. V. Teixeira and P. J. H. v. Oppen, "ABAT: An Approach for Building Maintainable Automated Functional Software Tests," XXVI International Conference of the Chilean Society of Computer Science (SCCC'07), Iquique, 2007, pp. 83-91. (Year: 2007).*

L. Nagowah and P. Roopnah, "AsT-A simple automated system testing tool," 2010 3rd International Conference on Computer Science and Information Technology, Chengdu, 2010, pp. 301-306. (Year: 2010).*

C. A. Siebra and N. Q. C. Lino, "Integration of autonomic mechanisms to a test management solution," 2014 9th International Conference on Software Engineering and Applications (ICSOFT-EA), Vienna, Austria, 2014, pp. 269-276. (Year: 2014).*

S. Thummalapenta, S. Sinha, N. Singhania and S. Chandra, "Automating test automation," 2012 34th International Conference on Software Engineering (ICSE), Zurich, 2012, pp. 881-891. (Year: 2012).*

S. Thummalapenta et al., "Efficient and change-resilient test automation: An industrial case study," 2013 35th International Conference on Software Engineering (ICSE), San Francisco, CA, 2013, pp. 1002-1011. (Year: 2013).*

* cited by examiner

METHOD AND SYSTEM FOR ENABLING SELF-MAINTAINABLE TEST AUTOMATION

FIELD OF THE DISCLOSURE

The present subject matter is related, in general to automated testing of computer applications, and more particularly, but not exclusively to a method and a system for enabling self-maintainable test automation.

BACKGROUND

Traditional testing of a computer program can include the external monitoring of integrity of the program and performance of the program, either subjectively based upon end user impression, or objectively based upon independently acquired metrics. Often, to test an application, testing personnel must establish and configure a testing environment. Within the testing environment, a test protocol can be defined for exercising a computing application. The individual steps and portions of the testing protocol, in turn, can be automated through operating system scripts, batch files and the like. In this regard, for a test protocol, a typical test cycle can include multiple phases that test a system from various angles, such as functional, performance, and system test phases.

Test automation brings down Test cycles resulting in faster and frequent release of software to market. However, current Test Automation frameworks are highly technical and require automation experts to deliver Automated Test Suites. Once an automated Test Suite is created, modifying it to incorporate future changes in application is very tedious, effort intensive and requires involvement of both Automation and Domain expertise. Therefore, there is a need for a method and a system that enables self-maintainable test automation eliminating the effort and expertise required to create, modify and maintain Test Automation Suites.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of enabling self-maintainable test automation. The method comprising the step of receiving one or more input test scenarios associated with one or more applications executing in a real time environment. The method further comprising comparing the one or more input test scenarios with one or more corresponding historical test scenarios to identify one or more functional changes associated with the one or more input test scenarios. Based on the comparison, one or more reusable automation units of the one or more input test scenarios are determined. Further, one or more test data units corresponding to the one or more reusable automation units are determined. The one or more reusable automation units and the one or more test data units thus determined above are updated based on the one or more functional changes thus identified.

Further, the present disclosure relates to a system for enabling self-maintainable test automation. The system comprises at least a processor and a test automation repository coupled with the processor and configured to store a test automation suite and one or more historical test scenarios. The system further comprises a memory communicatively coupled with the processor, wherein the memory stores processor-executable instructions, which, on execution, cause the processor to receive one or more input test scenarios associated with one or more applications executing in a real time environment. The processor is configured to compare the one or more input test scenarios with the one or more corresponding historical test scenarios to identify one or more functional changes associated with the one or more input test scenarios. Based on the comparison, the processor is configured to determine one or more reusable automation units of the one or more input test scenarios and one or more test data units corresponding to the one or more reusable automation units. The processor further updates the one or more reusable automation units and the one or more test data units based on the one or more functional changes thus identified.

Furthermore, the present disclosure relates to a non-transitory computer readable medium including instructions stored thereon that when processed by at least one processor cause a system to perform the act of one or more input test scenarios associated with one or more applications executing in a real time environment. Further, the instructions cause the processor to compare the one or more input test scenarios with one or more corresponding historical test scenarios to identify one or more functional changes associated with the one or more input test scenarios. Based on the comparison, the processor determines one or more reusable automation units of the one or more input test scenarios. The processor is further configured to determine one or more test data units corresponding to the one or more reusable automation units and update the one or more reusable automation units and the one or more test data units based on the one or more functional changes thus identified.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
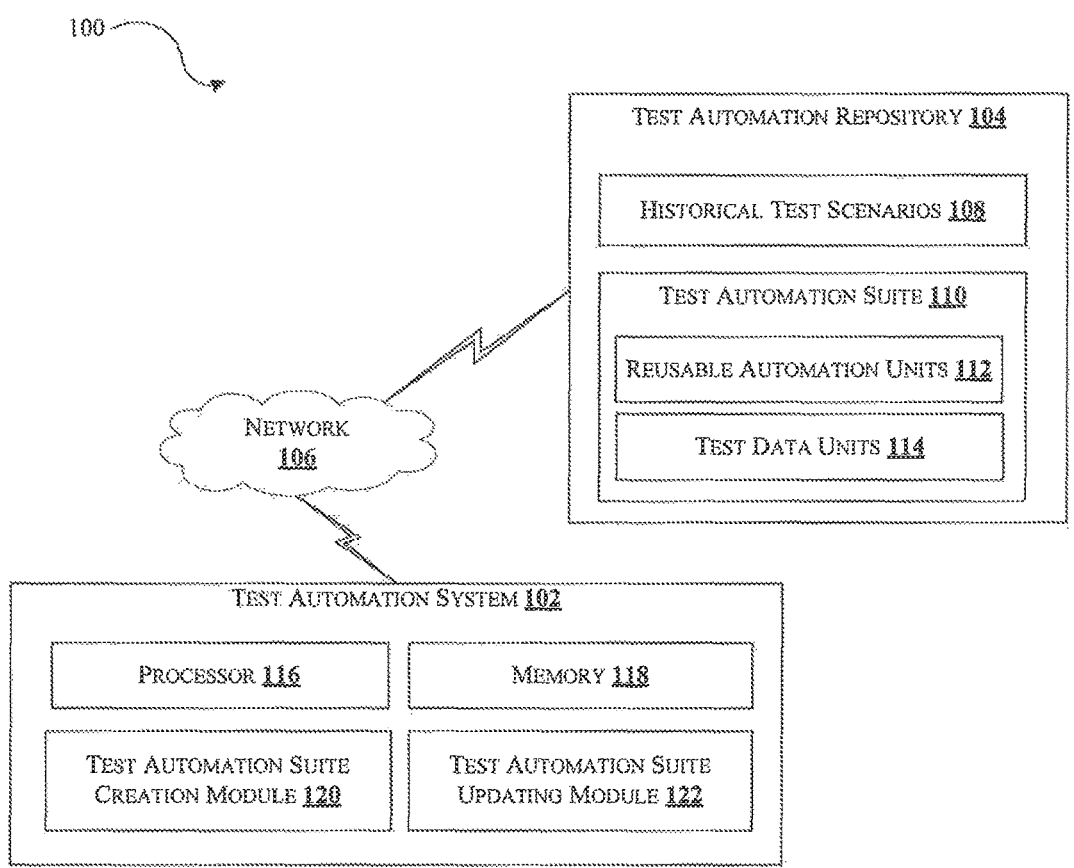
FIG. 1 illustrates an architecture diagram of an exemplary system for enabling self-maintainable test automation in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for enabling self-maintainable test automation. In one embodiment, the system creates a test automation suite using historical test scenarios and updates the test automation suite automatically based on functional changes in one or more related applications. The system determines one or more reusable automation units and one or more test data units that are affected by the functional changes identified in test scenarios received as input and accordingly updates the one or more reusable automation units and one or more test data units with the functional changes. Thus, the system enables self-maintainable test automation, thereby eliminating the effort and expertise required to create automation test suite, build automation scripts, and modify automation scripts for future enhancements.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an architecture diagram of an exemplary system for enabling self-maintainable test automation in accordance with some embodiments of the present disclosure.

As shown in FIG. 1, the exemplary system 100 comprises one or more components configured for enabling self-maintainable test automation. In one embodiment, the exemplary system 100 comprises a test automation system (hereinafter referred to as TAS) 102, and a test automation repository 104 connected via a communication network 106. The test automation repository 104 is configured to store one or more historical test scenarios 108 and one or more test automation suite 110.

The one or more test automation suite 110 is a reusable test automation framework comprising one or more reusable automation units 112 and one or more test data units 114 associated with the one or more reusable automation units 112. The one or more reusable automation units (RAUs) 112 may be for example, a collection or logical grouping of one or more steps that can be performed frequently. The one or more reusable test data units (TDUs) 114 may be for example, a collection or logical group of one or more test data that can be used by the one or more RAUs 112. The one or more RAUs 112 and the one or more TDUs 114 are arranged in one or more orders to generate one or more test automation suite 110 and stored in the test automation repository 104. In one embodiment, the test automation repository 104 may be integrated within the TAS 102. In another embodiment, the test automation repository 104 may be configured independent without being integrated within the TAS 102.

The TAS 102 comprises at least a processor 116 and a memory 118 coupled with the processor 116. The TAS 102 further comprises a test automation suite creation module (hereinafter referred to as "TAS creation module") 120 and a test automation suite updating module (hereinafter referred to as "TAS updation module") 122 coupled with the processor 116. The TAS creation module 120 is configured to create one or more test automation suite 110 and the TAS updation module 122 is configured to update the one or more test automation suite 110 based on one or more functional changes associated with execution of one or more applications in a real time environment.

Figure 2A:
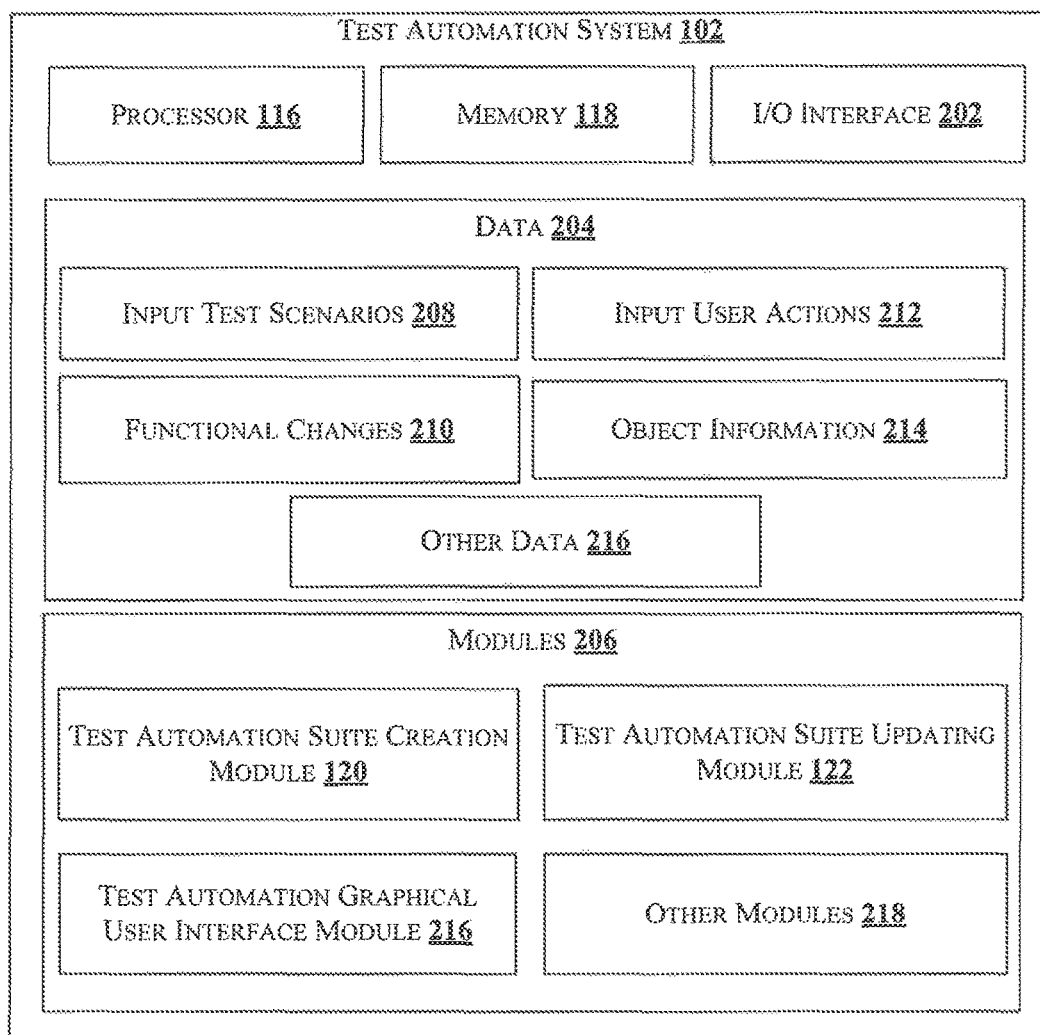
FIG. 2a illustrates an exemplary block diagram of a test automation system of FIG. 1 in accordance with some embodiments of the present disclosure.

In one embodiment, the TAS 102 may be a typical TAS as illustrated in FIG. 2a. The TAS 102 comprises the processor 116, the memory 118, and an I/O interface 202. The 1/O interface 202 is coupled with the processor 116 and an I/O device. The I/O device is configured to receive inputs via the I/O interface 202 and transmit outputs for displaying in the I/O device via the I/O interface 202. The TAS 102 further comprises data 204 and modules 206. In one implementation, the data 204 and the modules 206 may be stored within the memory 118. In one example, the data 204 may include one or more input test scenarios 208, the one or more functional changes 210, one or more input user actions 212, one or more object information 214 and other data 216. In one embodiment, the data 204 may be stored in the memory 118 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data and temporary files, generated by the modules 206 for performing the various functions of the TAS 102.

Figure 2B:
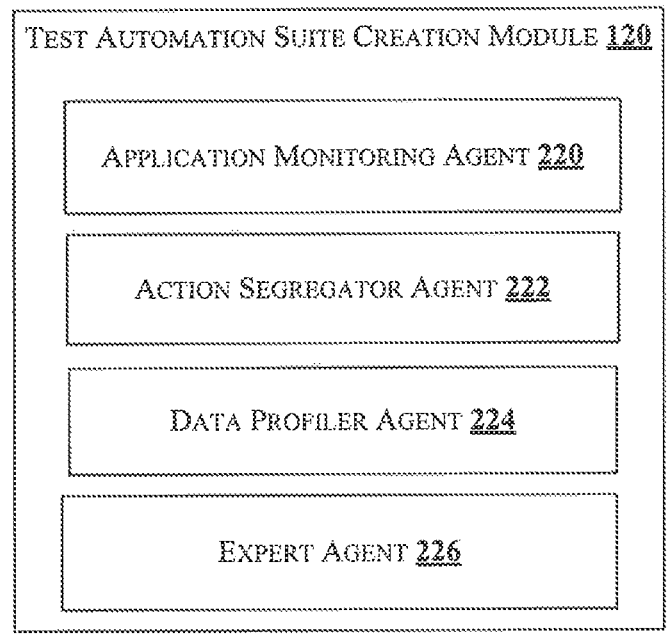
FIG. 2b illustrates an exemplary block diagram of test automation suite creation module and test automation suite updating module of FIG. 2a in accordance with some embodiments of the present disclosure.
Figure 2C:
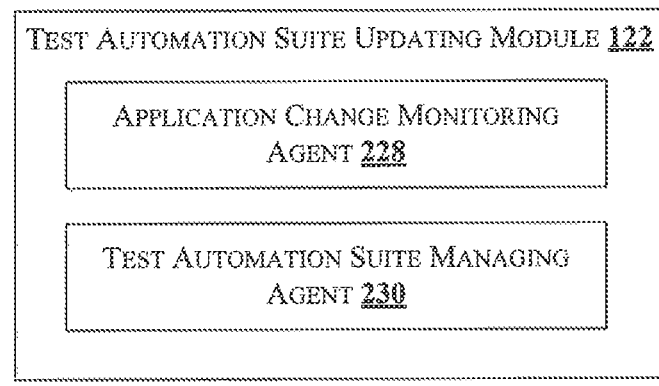
FIG. 2c illustrates an exemplary TAS updating module which includes sub-modules such as an application change monitoring agent and a test automation suite (TAS) managing agent in accordance with some embodiments of the present disclosure.

The modules 206 may include, for example, the TAS creation module 120, the TAS updating module 122, and a test automation graphical user interface module (TAGUI) 218. The modules 206 may also comprise other modules 218 to perform various miscellaneous functionalities of the TAS 102. As illustrated in FIG. 2b, the TAS creation module 120 includes sub-modules such as an application monitoring agent 220, an action segregator agent 222, a data profiler agent 224 and an expert agent 226. Further, as illustrated in FIG. 2c, the TAS updating module 122 includes sub-modules such as an application change monitoring agent 228 and a test automation suite (TAS) managing agent 230. It will be appreciated that such aforementioned modules may be represented as a single module or a combination of different modules. The modules 206 may be implemented in the form of software, hardware and/or firmware.

In operation, the TAS 102 creates a self-maintainable test automation suite 110 for automating test scenarios. In one embodiment, the TAS creation module 120 creates the one or more test automation suites 110 based on one or more historical test scenarios 108. The one or more historical test scenarios 108 can include a collection of test scenarios, each test scenario may be arranged from an ordered selection of steps and supplemental test data based on one or more test user actions. For example, a test scenario for an e-commerce application to register a user can include the ordered combination of application specific user login function, an application specific user registration function and an application specific verification function. In addition, the test scenario may also include specific user credentials and user details for use when a user is registered through the user registration scenario. In one implementation, the one or more historical test scenarios 108 may be created by a conventional test scenario generator known in the art.

In another example, a test scenario for an e-commerce application to place order for a product can include the ordered combination of application specific user login function, an application specific search function, add to bag function, checkout function, shipping and billing function, payment function, place order function and verification function. In addition, the test scenario may also include specific user credentials, specific product details, specific user details like address, payment details and so on.

The application monitoring agent 220 is configured to track one or more applications that are loaded into a test environment comprising the TAS 102 for testing purposes. The test environment enables loading and execution of the one or more applications for testing. One or more applications may include one or more versions or releases of test applications that may be executed for testing purposes. The application monitoring agent 220 monitors the one or more applications, for example an e-commerce application that are executed by the TAS 102. In one embodiment, the application monitoring agent 220 records one or more training test scenarios of the one or more applications such as user registration, place order by search and credit card and place order by browse and gift card etc. and clusters the one or more training test scenarios based on logical similarity among the one or more training test scenarios. In one implementation, the application monitoring agent 220 derives the one or more user actions corresponding to the one or more training test scenarios received during the execution of the one or more applications. For example, the application monitoring agent 220 derives the one or more user actions such as login, registration, browse, search, add to bag, checkout, payment, shipping, billing, place order and verify and so on. The action segregator agent 222 processes and groups the one or more user actions into one or more automated system actions based on logical similarity among the one or more user actions thus derived. For example, the action segregator agent 222 creates the one or more automated system actions based on grouping of the one or more similar user actions like for example, browse and search grouped together, shipping and billing grouped together etc. Based on the one or more automated system actions thus created, the expert agent 226 determines the one or more RAUs 112 and the one or more TDUs 114.

In one embodiment, the expert agent 226 compares the one or more training test scenarios with historical test scenarios 108 recorded in the past and determines one or more similar automated system actions based on comparison. The expert agent 226 further determines the one or more RAUs 112 comprising the one or more similar automated systems, for example, login, browse, and payment and so on. The data profiler agent 224 determines the one or more test data associated with the one or more similar automated system actions for example, user credentials, product details and credit card or gift card details etc., and creates the one or more TDUs 114 based on the one or more test data thus determined. Upon creating the one or more RAUs 112 and the one or more TDUs 114, the expert agent 226 creates the one or more test automation suite 110 comprising the one or more RAUs 112 and the one or more TDUs 114 and stores the one or more test automation suite 110 in the test automation repository 104. The one or more test automation suite 110 thus created shall be used to enable self-maintainable test automation in real time environment.

In addition, the expert agent 226 is also configured to store information associated with one or more objects or controls associated with the one or more applications thus executed. In one embodiment, the expert agent 226 receives and records key strokes associated with the one or more user actions associated with the one or more training test scenarios and associates the recorded key strokes with one or more objects. For each object, the expert agent 226 determines the one or more object information comprising at least a location or a unique resource identifier and one or more properties associated with each object and store the one or more object information in the test automation repository 104.

In real time environment, the TAS updating module 112 is configured to automatically update the test automation suite 110 at any time when there is one or more functional changes identified in one or more applications. In one embodiment, the application change monitoring agent (ACMA) 228 receives one or more input test scenarios 208 associated with one or more application executing in the real time environment. In one example, the one or more input test scenarios includes one or more input user actions 212 associated with the one or more input test scenarios 208. Upon receiving, the ACMA 228 determines the one or more RAUs corresponding to the one or more input test scenarios 208. In one implementation, the ACMA 228 compares the one or more input test scenarios 208 with one or more corresponding historical test scenarios 108 stored in the test automation repository 104 and identifies one or more functional changes 210 associated with the one or more input test scenarios 208 based on the comparison. Upon the identification, the ACMA 228 determines the one or more RAUs affected by the one or more functional changes. In one implementation, the ACMA 228 determines the one or more RAUs comprising one or more user actions similar to the one or more input user actions 212 using cognitive and machine learning methods. Based on the determination of the one or more RAUs, the ACMA 228 further determines the one or more TDUs corresponding to the one or more RAUs thus determined. The TAS managing agent 230 updates the one or more RAUs and the one or more TDUs with the one or more identified functional changes 210 and accordingly updates the one or more test automation suite 110 with the updated RAUs and TDUs.

Further, the ACMA 228 determines one or more objects associated with the one or more input user actions 212 and updates the one or more object information related with the one or more determined objects. For example, the ACMA 228 receives and records key strokes associated with the one or more input user actions 212 and identifies one or more associated objects or controls. The ACMA 228 determines the one or more object information corresponding to the one or more associated objects or controls and updates the object information with the one or more functional changes 210.

In one embodiment, the ACMA 228 updates the one or more object information such as location and/or properties associated with the one or more objects and stores the updated object information in the test automation repository 104. In one embodiment, the one or more object information may be stored along with the one or more RAUs 112 and the one or more TDUs 114 of the one or more test automation suite 110 in the test automation repository 104. In another embodiment, the one or more object information may be stored independent of the one or more test automation suite 110 along with rules defining the mapping of the one or more object information with the one or more test automation suite 110.

Thus, the above disclosed system enables self-maintainable test automation, thereby eliminating the effort and expertise required to create automation test suite, build automation scripts, and modify automation scripts for future enhancements.

Figure 3A:
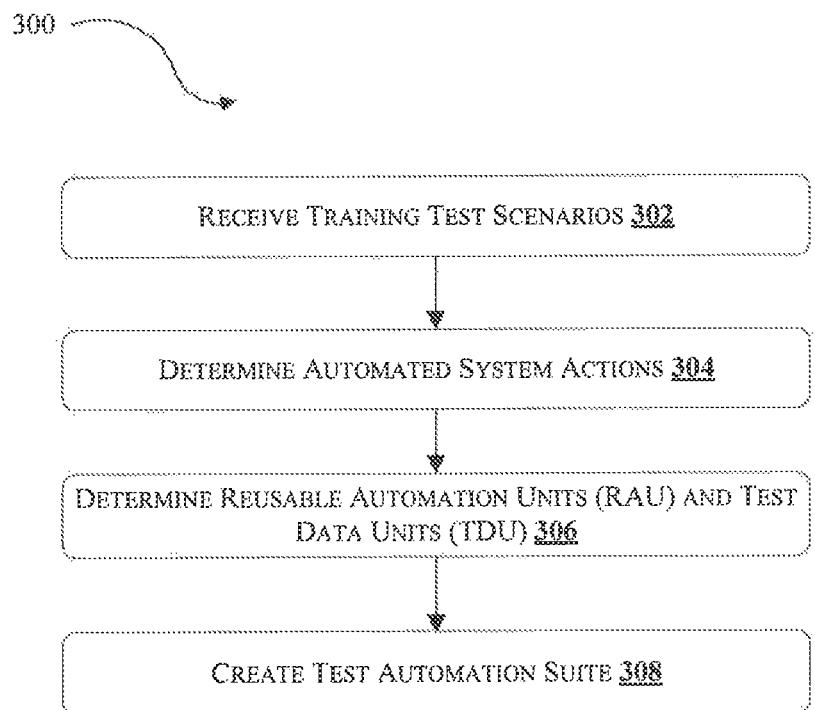
FIG. 3a illustrates a flowchart of an exemplary method of creation of test automation suite in accordance with some embodiments of the present disclosure.

FIG. 3a illustrates a flowchart of a method of creation of test automation suite in accordance with some embodiments of the present disclosure.

As illustrated in FIG. 3a, the method 300 comprises one or more blocks implemented by the processor 116 for creation of test automation suite. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive training test scenario. In one embodiment, the application monitoring agent 220 is configured to track one or more applications that are loaded into a test environment comprising the TAS 102 for testing purposes. The test environment enables loading and execution of the one or more applications for testing. One or more applications may include one or more versions or releases of test applications that may be executed for testing purposes. The application monitoring agent 220 monitors the one or more applications, for example an e-commerce application that are executed by the TAS 102.

At block 304, determine automated system actions. In one embodiment, the application monitoring agent 220 records one or more training test scenarios of the one or more applications such as user registration, place order by search and credit card and place order by browse and gift card etc. and clusters the one or more training test scenarios based on logical similarity among the one or more training test scenarios. In one implementation, the application monitoring agent 220 derives the one or more user actions corresponding to the one or more training test scenarios received during the execution of the one or more applications. For example, the application monitoring agent 220 derives the one or more user actions such as login, registration, browse, search, add to bag, checkout, payment, shipping, billing, place order and verify and so on. The action segregator agent 222 processes and groups the one or more user actions into one or more automated system actions based on logical similarity among the one or more user actions thus derived. For example, the action segregator agent 222 creates the one or more automated system actions based on grouping of the one or more similar user actions like for example, browse and search grouped together, shipping and billing grouped together etc. Based on the one or more automated system actions thus created, the expert agent 226 determines the one or more RAUs 112 and the one or more TDUs 114.

At block 306, determine reusable automation units (RAU) and test data units (TDU). In one embodiment, the expert agent 226 compares the one or more training test scenarios with historical test scenarios 108 recorded in the past and determines one or more similar automated system actions based on comparison. The expert agent 226 further determines the one or more RAUs 112 comprising the one or more similar automated systems, for example, login, browse, and payment and so on. The data profiler agent 224 determines the one or more test data associated with the one or more similar automated system actions for example, user credentials, product details and credit card or gift card details etc., and creates the one or more TDUs 114 based on the one or more test data thus determined. Upon creating the one or more RAUs 112 and the one or more TDUs 114, the expert agent 226 creates the one or more test automation suite 110.

At block 308, create test automation suite. In one embodiment, the expert agent 226 creates the one or more test automation suite 110 comprising the one or more RAUs 112 and the one or more TDUs 114 and stores the one or more test automation suite 110 in the test automation repository 104. The one or more test automation suite 110 thus created shall be used to enable self-maintainable test automation in real time environment.

In addition, the expert agent 226 is also configured to store information associated with one or more objects or controls associated with the one or more applications thus executed. In one embodiment, the expert agent 226 receives and records key strokes associated with the one or more user actions associated with the one or more training test scenarios and associates the recorded key strokes with one or more objects. For each object, the expert agent 226 determines the one or more object information comprising at least a location or a unique resource identifier and one or more properties associated with each object and store the one or more object information in the test automation repository 104.

Thus, the above disclosed method 300 enables creation of self-maintainable test automation, thereby eliminating the effort and expertise required to create automation test suite, build automation scripts, and modify automation scripts for future enhancements.

Figure 3B:
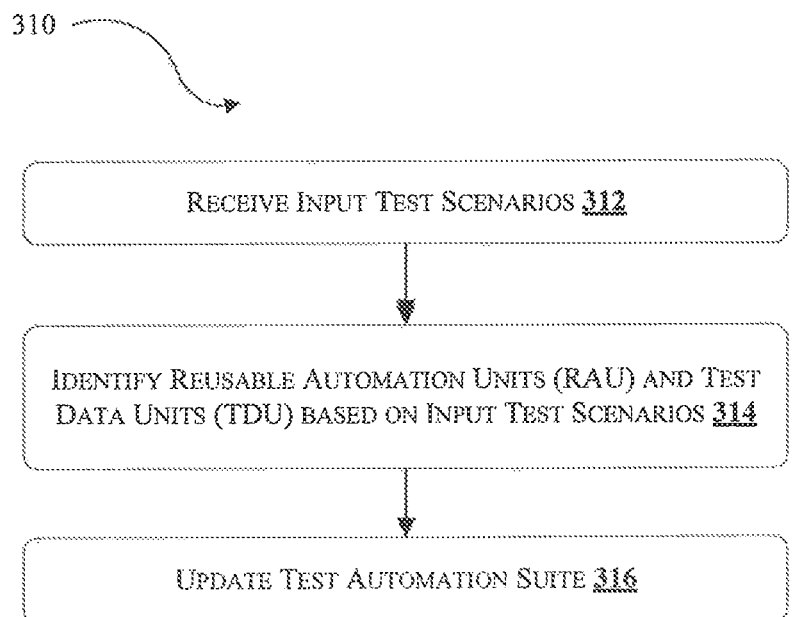
FIG. 3b illustrates a flowchart of an exemplary method of enabling self-maintainable test automation in accordance with some embodiments of the present disclosure.

FIG. 3b illustrates a flowchart of a method of enabling self-maintainable test automation in accordance with some embodiments of the present disclosure.

As illustrated in FIG. 3b, the method 310 comprises one or more blocks implemented by the processor 116 for enabling self-maintainable test automation. The method 310 may be described in the general context of computer executable instructions. Generally, computer executable instructions can include routines, programs, objects, components, data structures, procedures, modules, and functions, which perform particular functions or implement particular abstract data types.

The order in which the method 310 is described is not intended to be construed as a limitation, and any number of the described method blocks can be combined in any order to implement the method 310. Additionally, individual blocks may be deleted from the method 310 without departing from the spirit and scope of the subject matter described herein. Furthermore, the method 310 can be implemented in any suitable hardware, software, firmware, or combination thereof.

At block 312, receive input test scenarios. In real time environment, the TAS updating module 112 is configured to automatically update the test automation suite 110 at any time when there is one or more functional changes identified in one or more applications. In one embodiment, the application change monitoring agent (ACMA) 228 receives one or more input test scenarios 208 associated with one or more application executing in the real time environment. In one example, the one or more input test scenarios includes one or more input user actions 212 associated with the one or more input test scenarios 208. Upon receiving, the ACMA 228 determines the one or more RAUs corresponding to the one or more input test scenarios 208.

At block 314, identify RAU and TDU based on input test scenarios. In one embodiment, the ACMA 228 determines the one or more RAUs corresponding to the one or more input test scenarios 208. In one implementation, the ACMA 228 compares the one or more input test scenarios 208 with one or more corresponding historical test scenarios 108 stored in the test automation repository 104 and identifies one or more functional changes 210 associated with the one or more input test scenarios 208 based on the comparison. Upon the identification, the ACMA 228 determines the one or more RAUs affected by the one or more functional changes. In one implementation, the ACMA 228 determines the one or more RAUs comprising one or more user actions similar to the one or more input user actions 212 using cognitive and machine learning methods. Based on the determination of the one or more RAUs, the ACMA 228 further determines the one or more TDUs corresponding to the one or more RAUs thus determined.

At block 316, update test automation suite. In one embodiment, the TAS managing agent 230 updates the one or more RAUs and the one or more TDUs with the one or more identified functional changes 210 and accordingly updates the one or more test automation suite 110 with the updated RAUs and TDUs.

Further, the ACMA 228 determines one or more objects associated with the one or more input user actions 212 and updates the one or more object information related with the one or more determined objects. For example, the ACMA 228 receives and records key strokes associated with the one or more input user actions 212 and identifies one or more associated objects or controls. The ACMA 228 determines the one or more object information corresponding to the one or more associated objects or controls and updates the object information with the one or more functional changes 210.

In one embodiment, the ACMA 228 updates the one or more object information such as location and/or properties associated with the one or more objects and stores the updated object information in the test automation repository 104. In one embodiment, the one or more object information may be stored along with the one or more RAUs 112 and the one or more TDUs 114 of the one or more test automation suite 110 in the test automation repository 104. In another embodiment, the one or more object information may be stored independent of the one or more test automation suite 110 along with rules defining the mapping of the one or more object information with the one or more test automation suite 110.

Thus, the above disclosed method 310 enables self-maintainable test automation, thereby eliminating the effort and expertise required to create automation test suite, build automation scripts, and modify automation scripts for future enhancements.

Figure 4:
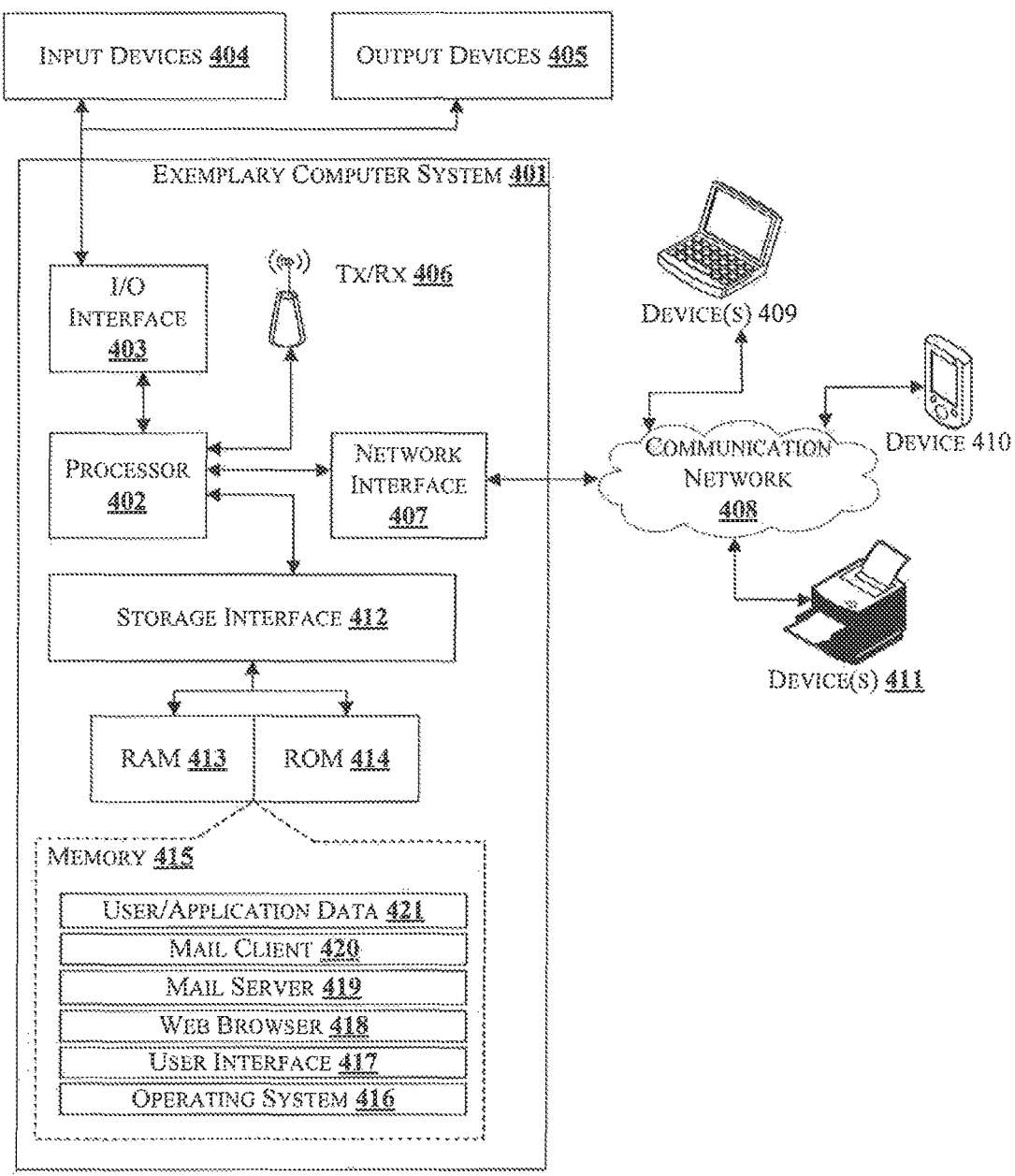
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, user interface application 517, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 208, amongst other things, include routines, programs, objects, components, and data structures, which perform particular tasks or implement particular abstract data types. The modules 208 may also be implemented as, signal processor(s), state machine(s), logic circuitries, and/or any other device or component that manipulate signals based on operational instructions. Further, the modules 208 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of enabling self-maintainable test automation by a test automation system, said method comprising:
    receiving, by the test automation system, one or more input test scenarios associated with one or more applications executing in a real-time environment;
    comparing, by the test automation system, the one or more input test scenarios with one or more corresponding historical test scenarios to identify one or more functional changes associated with the one or more input test scenarios, wherein the one or more corresponding historical test scenarios include a collection of test scenarios, each test scenario arranged from an ordered combination of selected steps and supplemental test data based on one or more test user actions;
    determining, by the test automation system, one or more reusable automation units of the one or more input test scenarios based on the comparison, wherein the one or more reusable automation units are a collection or logical grouping of the selected steps;
    determining, by the test automation system, one or more test data units corresponding to the one or more reusable automation units thus determined, wherein the one or more test data units are a collection or logical group of the supplemental test data that can be used by the one or more reusable automation units; and
    updating automatically, in a real-time environment, by the test automation system, the one or more reusable automation units and the one or more test data units based on an identification of the one or more functional changes associated with the one or more input test scenarios.

2. The method as claimed in claim 1, wherein determining the one or more reusable automation units comprises the step of determining one or more common user actions associated with both the one or more input test scenarios and the one or more historical test scenarios.

3. The method as claimed in claim 1, wherein determining the one or more test data units corresponding to the one or more reusable automation units comprises the step of determining one or more common test data associated with both the one or more input test scenarios and the one or more historical test scenarios.

4. The method as claimed in claim 1, further comprising:
    receiving one or more training test scenarios associated with one or more applications executed in a test environment coupled with a test automation repository;
    creating a test automation suite for the one or more training test scenarios, wherein the test automation suite comprising the one or more reusable automation units and the one or more test data units associated with the one or more training test scenarios; and
    storing the test automation suite and the one or more training test scenarios as the one or more historical test scenarios in the test automation repository.

5. The method as claimed in claim 4, wherein the step of creating the test automation suite comprising the steps of:
    deriving the one or more user actions corresponding to the one or more training test scenarios received based on the execution of the one or more applications;
    grouping the one or more user actions into one or more automated system actions based on logical similarity among the one or more user actions thus derived;
    determining the one or more reusable automation units based on the grouping of the one or more automated system actions;
    determining the one or more test data units corresponding to the one or more reusable automation units thus determined; and
    creating the test automation suite comprising the one or more reusable automation units and the one or more test data units.

6. The method as claimed in claim 1, wherein determining the one or more reusable automation units is performed using cognitive and machine learning methods.

7. The method as claimed in claim 1, further comprising:
    receiving the one or more test user actions associated with the one or more input test scenarios;
    determining one or more objects based on which the one or more test user actions are performed;
    determining one or more object information comprising at least a location and one or more properties associated with the one or more objects; and
    updating the one or more object information with the one or more functional changes associated with the one or more input test scenarios.

8. The method as claimed in claim 7, further comprising:
    recording key strokes associated with the one or more test user actions; and
    associating the recorded key strokes with the one or more objects.

9. A system for enabling self-maintainable test automation, said system comprising:

a processor;

a test automation repository coupled with the processor and configured to store a test automation suite and one or more historical test scenarios; and a memory communicatively coupled to the processor, wherein the memory stores processor-executable instructions, which, on execution, cause the processor to:

receive one or more input test scenarios associated with one or more applications executing in a real time environment;

compare the one or more input test scenarios with the one or more corresponding historical test scenarios to identify one or more functional changes associated with the one or more input test scenarios, wherein the one or more corresponding historical test scenarios include a collection of test scenarios, each test scenario arranged from an ordered combination of selected steps and supplemental test data based on one or more test user actions;

determine one or more reusable automation units of the one or more input test scenarios based on the comparison, wherein the one or more reusable automation units are a collection or logical grouping of the selected steps;

determine one or more test data units corresponding to the one or more reusable automation units thus determined wherein the one or more test data units are a collection or logical group of the supplemental test data that can be used by the one or more reusable automation units; and update automatically, in a real-time environment, by the test automation system, the one or more reusable automation units and the one or more test data units based on an identification of the one or more functional changes associated with the one or more input test scenarios.

10. The system as claimed in claim 9, wherein the processor is configured to determine the one or more reusable automation units by performing the step of determining one or more common user actions associated with both the one or more input test scenarios and the one or more historical test scenarios.

11. The system as claimed in claim 9, wherein the processor is configured to determine the one or more test data units corresponding to the one or more reusable automation units by performing the step of determining one or more common test data associated with both the one or more input test scenarios and the one or more historical test scenarios.

12. The system as claimed in claim 9, wherein the processor is further configured to perform the steps of:

receiving one or more training test scenarios associated with one or more applications executed in a test environment coupled with a test automation repository;

creating a test automation suite for the one or more training test scenarios, wherein the test automation suite comprising the one or more reusable automation units and the one or more test data units associated with the one or more training test scenarios; and storing the test automation suite and the one or more training test scenarios as the one or more historical test scenarios in the test automation repository.

13. The system as claimed in claim 12, wherein the processor is configured to create the test automation suite by performing the steps of:

deriving the one or more user actions corresponding to the one or more training test scenarios received based on the execution of the one or more applications;

grouping the one or more derived user actions into one or more automated system actions based on logical similarity among the one or more user actions thus derived;

determining the one or more reusable automation units based on the grouping of the one or more automated system actions;

determining the one or more test data units corresponding to the one or more reusable automation units thus determined; and creating the test automation suite comprising the one or more reusable automation units and the one or more test data units.

14. The system as claimed in claim 9, wherein the processor is further configured to perform one or more steps comprising:

receiving the one or more test user actions associated with the one or more input test scenarios;

determining one or more objects based on which the one or more test user actions are performed;

determining one or more object information comprising at least a location and one or more properties associated with the one or more objects; and updating the one or more determined object information with the one or more functional changes associated with the one or more input test scenarios.

15. A non-transitory computer readable medium including instructions stored thereon that when processed by at least one processor cause a test automation system to perform acts of:

receiving one or more input test scenarios associated with one or more applications executing in a real time environment;

comparing the one or more input test scenarios with one or more corresponding historical test scenarios to identify one or more functional changes associated with the one or more input test scenarios, wherein the one or more corresponding historical test scenarios include a collection of test scenarios, each test scenario arranged from an ordered combination of selected steps and supplemental test data based on one or more test user actions;

determining one or more reusable automation units of the one or more input test scenarios based on the comparison, wherein the one or more reusable automation units are a collection or logical grouping of the selected steps;

determining one or more test data units corresponding to the one or more reusable automation units thus determined, wherein the one or more test data units are a collection or logical group of the supplemental test data that can be used by the one or more reusable automation units; and updating automatically, in a real-time environment, by the test automation system, the one or more reusable automation units and the one or more test data units based on an identification of the one or more functional changes associated with the one or more input test scenarios.

16. The medium as claimed in claim 15, wherein the instructions stored thereon causes the at least one processor to determine the one or more reusable automation units comprising the step of determining one or more common user actions associated with both the one or more input test scenarios and the one or more historical test scenarios.

17. The medium as claimed in claim 15, wherein the instructions stored thereon causes the at least one processor to determine the one or more test data units corresponding to the one or more reusable automation units comprising the step of determining one or more common test data associated with both the one or more input test scenarios and the one or more historical test scenarios.

18. The medium as claimed in claim 15, wherein the instructions stored thereon further causes the at least one processor to perform the steps of:
receiving one or more training test scenarios associated with one or more applications executed in a test environment coupled with a test automation repository;
creating a test automation suite for the one or more training test scenarios, wherein the test automation suite comprising the one or more reusable automation units and the one or more test data units associated with the one or more training test scenarios; and
storing the test automation suite and the one or more training test scenarios as the one or more historical test scenarios in the test automation repository.

19. The medium as claimed in claim 18, wherein the instructions stored thereon causes the at least one processor to create the test automation suite by performing the steps of:
deriving the one or more user actions corresponding to the one or more training test scenarios received based on the execution of the one or more applications;
grouping the one or more derived user actions into one or more automated system actions based on logical similarity among the one or more user actions thus derived;
determining the one or more reusable automation units based on the grouping of the one or more automated system actions;
determining the one or more test data units corresponding to the one or more reusable automation units thus determined; and
creating the test automation suite comprising the one or more reusable automation units and the one or more test data units.

20. The medium as claimed in claim 15, wherein the instructions stored thereon further causes the at least one processor to perform one or more steps comprising:
receiving the one or more test user actions associated with the one or more input test scenarios;
determining one or more objects based on which the one or more actions are performed;
determining one or more object information comprising at least a location and one or more properties associated with the one or more objects; and
updating the one or more determined object information with the one or more functional changes associated with the one or more input test scenarios.

* * * * *